Dec. 2, 1958

J. GONSKI 2,862,700

BORING TYPE MINER

Filed April 10, 1957

INVENTOR.
Joseph Gonski
BY
Murray A. Fleeson
ATTORNEY

United States Patent Office 2,862,700
Patented Dec. 2, 1958

2,862,700

BORING TYPE MINER

Joseph Gonski, Chicago, Ill., assignor to Goodman Manufacturing Company, Chicago, Ill., a corporation of Illinois Application April 10, 1957, Serial No. 652,042

8 Claims. (Cl. 262—7)

This invention relates generally to boring type miners, and more particularly to a boring type miner having auxiliary means for fragmenting material resulting from the action of the boring arms into sizes which can at all times be efficiently removed by the material conveyor thereof.

One of the principal objects of this invention is to provide an auxiliary cutting means for large fragments resulting from the action of the boring arms of a boring type miner, and to reduce the size of such fragments for efficient transport on the conveyor of such miner.

Another object is to provide an auxiliary cutting means disposed in proximity to the material receiving throat of the conveyor of a boring type miner, which auxiliary cutting means is effective to reduce any large fragments to sizes efficiently transported by such conveyor.

Still another object is to provide such auxiliary cutting means in combination with flanking cutting and gathering mechanism, all effective to deliver to the material receiving throat of the conveyor fragments of sizes arranged to be efficiently moved by such conveyor.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

Figure 1:
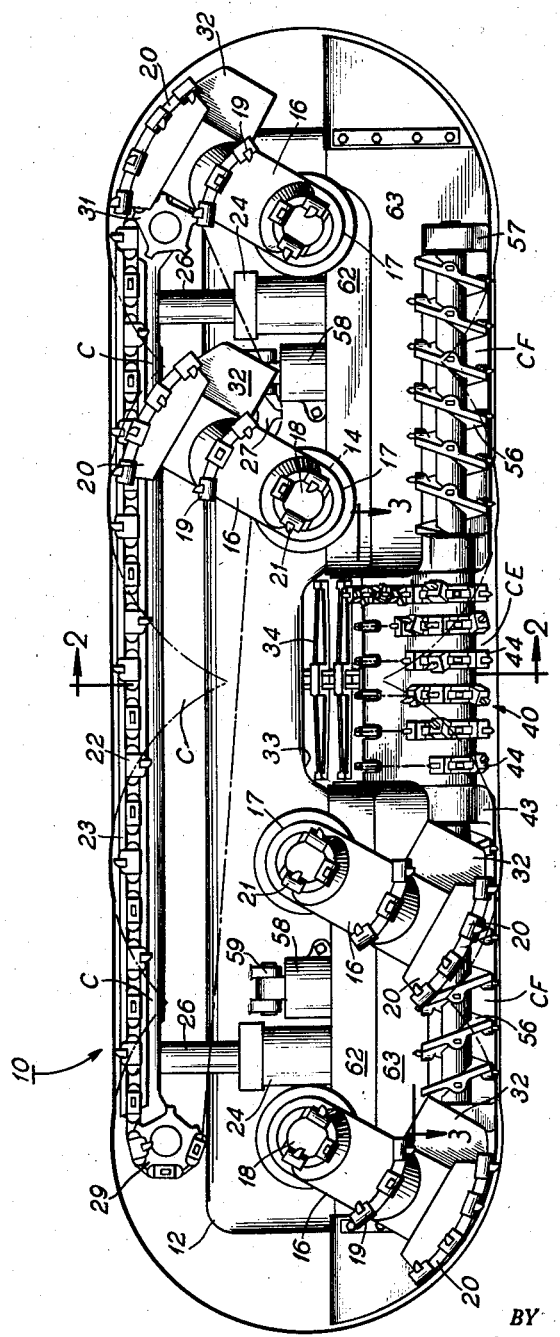
Fig. 1 is a front elevational view of a boring type miner having the improvements according to the present invention embodied therein.
Figure 2:
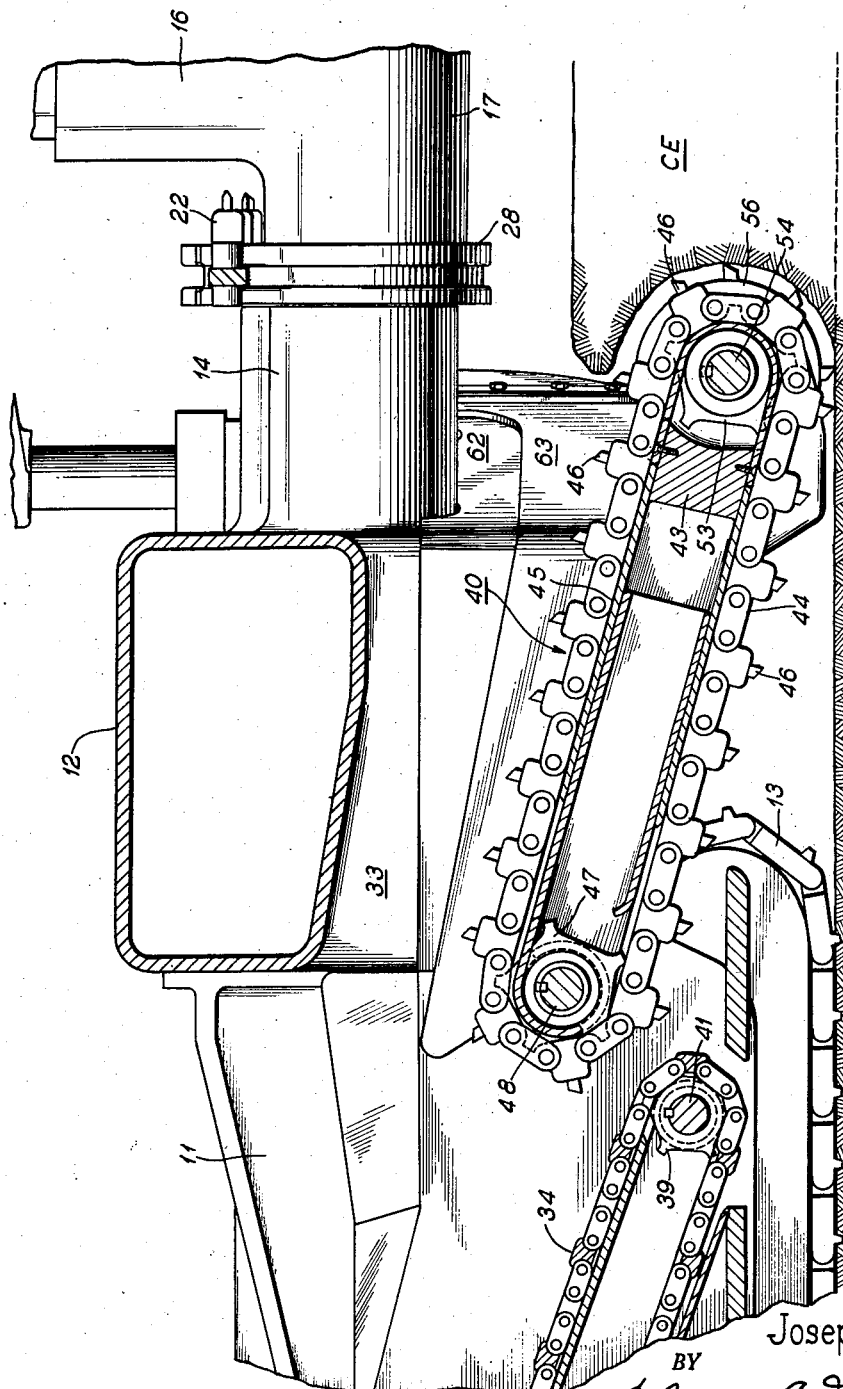
Fig. 2 is a section taken along the line 2—2 of Fig. 1, looking in the direction of the arrows, showing details of auxiliary cutting means for the miner seen in Fig. 1.
Figure 4:
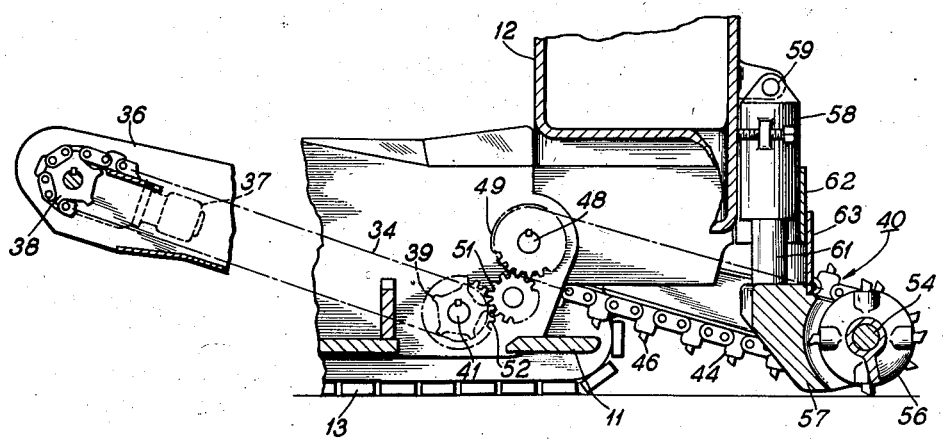
Fig. 4 is an elevational view taken along the line 4—4 of Fig. 3 looking in the direction of the arrows.

Referring now particularly to Fig. 1 of the drawings, the improved boring type miner according to the present invention is referred to generally by the reference numeral 10 and includes a frame 11 with a boring head 12 mounted thereon. The frame 11 and the boring head 12 are mounted for movement on endless crawler treads 13 as seen in Figs. 2 and 4. The boring head 12 has extending therefrom supports 14 for boring arms 16 each extending from a hub 17 fast upon a boring shaft 18 turning and journaled within the support 14.

As seen in Fig. 1, each of the boring arms 16 supports cutter bit elements 19 and 20 arranged to cut concentric annular kerfs in a seam of mineral, each boring arm also supporting central pilot cutter elements 21, in a fashion well known in the art. As seen also in Fig. 1 there are four such boring arms 16, the right-hand two boring arms rotating in clockwise direction, and the left two rotating in counter-clockwise direction to cut a plurality of contiguous bores. The operation of the boring arms 16 is such as to leave upper depending cusps C, and these are removed by an endless cutter chain 22 movable in a chain guide 23 which is raised and lowered to working position by means of spaced cylinders 24 having piston rods 26 therein connected at their upper ends to the guide 23.

The endless chain 22 is driven by a driving sprocket 27 and is trained for movement about an idler shoe 28 at one of the boring arms as seen in Fig. 2, and about an idler sprocket 29 mounted at one end of the guide 23, and about a similar idler sprocket 31 at the other end of the guide 23.

Each boring arm 16 has a vane 32 thereon which operates to move the dislodged material to a central throat 33 in the boring head 12. As seen particularly in Fig. 2, the throat 33 has an endless chain flight conveyor 34 therein which discharges the material conveyed thereby at a discharge boom 36, see also Fig. 4, the endless flight conveyor 34 being driven by a fluid motor 37 in turn driving a chain sprocket 38. The endless flight conveyor 34 is reversed in direction about an idler sprocket 39 fast upon a shaft 41.

The operation of the boring arms 16, 16 is such as to cause a central upstanding cusp CE and flanking upstanding cusps CF, see Fig. 1. The central upstanding cusp CE is arranged to be removed by a ripper type auxiliary cutting means or cutting head referred to generally by the reference numeral 40. The ripper head 40 in addition to cutting out the central cusp CE operates to convey the fragmented material to the endless flight conveyor 34 in the material receiving throat 33, and operates also to reduce any large lumps resulting from the action of the boring arms 16 to a size which can conveniently pass the throat 33 and be carried by conveyor 34.

Figure 3:
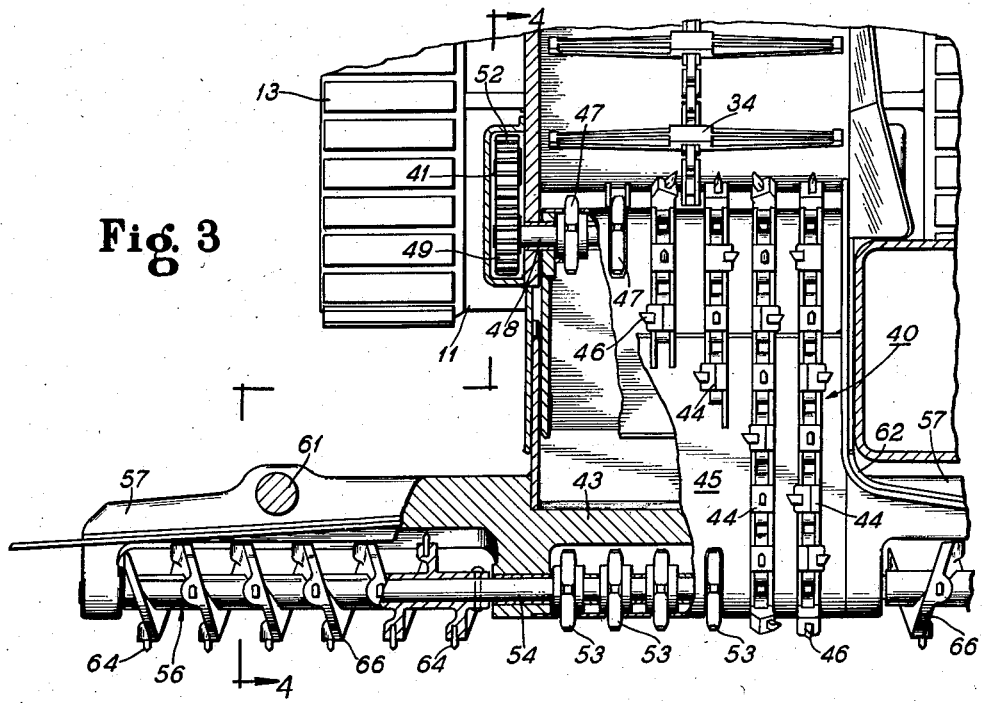
Fig. 3 is a fragmentary plan view looking in the direction of the arrows 3—3 of Fig. 1, certain parts being shown in section, showing further details of auxiliary cutting and conveying means.

The ripper head 40 accordingly includes a frame 43 having a supporting surface 45 for a plurality of endless cutter chains 44 arranged in side by side relationship as seen in Figs. 1 and 3, and having cutter elements 46 thereon. The endless cutting chains 44 are arranged to be driven by the same motor driving the chains flight conveyor 34. A driving sprocket 47 mounted upon a shaft 48 has a gear 49 fast thereon and meshing with a reaching gear 51 in turn meshing with a gear 52 fast upon the shaft 41 supporting the sprocket 39 for the chain flight conveyor 34. As seen particularly in Figs. 2 and 3 the endless cutter chains 44 are reversed in direction about sprockets 53 fast upon a shaft 54.

The flanking upstanding cusps CF are arranged to be removed by a scroll type cutting conveyor 56 supported by the frame 43 for the auxiliary conveyor 40. The frame 43 has extensions 57 therefrom which support the outer ends of the scroll type conveyor 56, and the frame 43 and extensions 57 are raised and lowered by means of cylinders 58 hingedly connected at 59 to the front side of the boring head 12. Each cylinder 58 has a piston 61 therein pivotally connected to the frame extension 57. When the frame extensions 57 are raised and lowered the auxiliary ripper head 40 and the scroll conveyor 56 pivot about the shaft 48 as a center, the lifting cylinders 58 pivoting at 59 during such movement.

The boring head 12 supports a fixed pusher plate 62, and an auxiliary pusher plate 63 moves in telescoping relationship with respect to the fixed pusher plate 62 as seen in Fig. 4, the movable pusher plate 63 being mounted upon the frame extension 57.

As seen in Fig. 2 the shaft 54 supporting the sprockets 53 also supports the scroll cutting conveyor 56. The helical vanes 66 thereof support cutting elements 64, and these in their rotation cut the cusps CF whilst the vane 66 moves the material toward the central auxiliary ripper head 40.

Structure according to the present invention insures at all times that the material receiving throat 33 will not be jammed with fragments too large to pass same, the ripper conveyor 40 always reducing the fragments to sizes conveniently passing the throat and easily transported by the endless flight conveyor 34.

While the invention has been described in terms of a preferred embodiment thereof its scope is intended to be limited only by the claims here appended.

I claim as my invention:

1. A boring type miner comprising side by side pairs of boring arms arranged to cut contiguous bores in a solid seam, means for cutting the upper cusps remaining from the action of said boring arms, a material receiving throat having a material removing conveyor therein disposed between the side by side pairs of boring arms, auxiliary cutting means for cutting the lower cusps remaining from the action of said boring arms comprising a frame disposed in proximity to said material receiving throat, endless chain mounted cutter elements movable on said frame, means for driving said endless chain mounted cutter elements, said endless chain cutter elements moving in the same direction as said material moving conveyor and being so related to said throat as to cut large fragments to proper size by holding same at said throat, and cutting and conveying means mounted in flanking relationship to said frame for cutting the remainder of the lower cusps remaining from the action of each pair of boring arms flanking said throat, a driving connection between said material removing conveyor and said auxiliary cutting means, and means for raising and lowering said auxiliary cutting means and said cutting and conveying means.

2. A boring type miner comprising side by side pairs of boring arms arranged to cut contiguous bores in a solid seam, means for cutting the upper cusps remaining from the action of said boring arms, a material receiving throat having a material removing conveyor therein disposed between the side by side pairs of boring arms, auxiliary cutting means for cutting the lower cusps remaining from the action of said boring arms comprising a frame disposed in proximity to said material receiving throat, endless chain mounted cutter and conveying elements movable on said frame, said endless chain cutter elements moving in the same direction as said material moving conveyor, and being so related to said throat as to cut large fragments to proper size by holding said large fragments at said throat, means for driving said endless chain mounted cutter elements, and cutting and conveying means mounted on said frame in flanking relationship to said auxiliary cutting means for cutting the lower cusps remaining from the action of each pair of boring arms flanking said throat, said cuttings and conveying means comprising a helix having cutting elements thereon.

3. A boring type miner comprising side by side pairs of boring arms arranged to cut contiguous bores in a solid seam, a material receiving throat having a material removing conveyor therein disposed between the side by side pairs of boring arms, and auxiliary cutting means for cutting the lower cusps remaining from the action of said boring arms comprising a frame disposed in proximity to said material receiving throat, endless chain mounted cutter elements movable on said frame, means for driving said endless chain mounted cutter elements, said endless chain cutter elements moving in the same direction as said material moving conveyor, and being so related to said throat as to cut large fragments to proper size by holding said large fragments at said throat, and cutting and conveying means mounted on said frame in flanking relationship to said auxiliary cutting means for cutting the lower cusps remaining from the action of each pair of boring arms flanking said throat, said cuttings and conveying means comprising a helix having cutting elements thereon, and a driving connection between said material removing conveyor and said auxiliary cutting means.

4. A boring type miner comprising side by side pairs of boring arms arranged to cut contiguous bores in a solid seam, a material receiving throat having a material removing conveyor therein disposed between the side by side pairs of boring arms, and auxiliary cutting means for cutting the lower cusps remaining from the action of said boring arms comprising a frame disposed in proximity to said material receiving throat, endless chain mounted cutter elements movable on said frame, means for driving said endless chain mounted cutter elements, said endless chain cutter elements moving in the same direction as said material moving conveyor, and being so related to said throat as to cut large fragments to proper size by holding said large fragments at said throat, and cutting and conveying means mounted in flanking relationship to said frame for cutting the lower cusps remaining from the action of each pair of boring arms flanking said throat, said cuttings and conveying means comprising a helix having cutting elements thereon.

5. A boring type miner comprising side by side pairs of boring arms arranged to cut contiguous bores in a solid seam, means for cutting the upper cusps remaining from the action of said boring arms, a material receiving throat having a material removing conveyor therein disposed between the side by side pairs of boring arms, and auxiliary cutting means for cutting the lower cusps remaining from the action of said boring arms comprising a frame disposed in proximity to said material receiving throat, endless chain mounted cutter elements movable on said frame, means for driving said endless chain mounted cutter elements, said endless chain cutter elements moving in the same direction as said material moving conveyor, and being so related to said throat as to cut large fragments to proper size by holding said large fragments at said throat, and cutting and conveying means mounted in flanking relationship to said frame for cutting the lower cusps remaining from the action of each pair of boring arms flanking said throat.

6. A boring type miner comprising side by side pairs of boring arms arranged to cut contiguous bores in a solid seam, a material receiving throat having a material removing conveyor therein disposed between the side by side pairs of boring arms, and auxiliary cutting means for cutting the lower cusps remaining from the action of said boring arms comprising a frame disposed in proximity to said material receiving throat, endless chain mounted cutter elements movable on said frame, means for driving said endless chain mounted cutter elements, said endless chain cutter elements moving in the same direction as said material moving conveyor, and being so related to said throat as to cut large fragments to proper size by holding said large fragments at said throat, and cutting and conveying means mounted in flanking relationship to said frame for cutting the lower cusps remaining from the action of each pair of boring arms flanking said throat.

7. A boring type miner comprising a pair of boring arms arranged to cut contiguous bores in a solid seam, a material receiving throat having a material removing conveyor therein disposed between said boring arms, and auxiliary cutting means disposed in said material receiving throat comprising a frame, a plurality of side by side endless cutter chains movable on said frame, said endless chain cutter elements moving in the same direction as said material moving conveyor, and being so related to said throat as to cut large fragments to proper size by holding said large fragments at said throat, and a driving connection between said material removing conveyor and said auxiliary cutting means.

8. A boring type miner comprising a pair of boring arms arranged to cut contiguous bores in a solid seam, means for cutting an upper cusp remaining from the action of said boring arms, a material receiving throat having a material removing conveyor therein disposed between said boring arms, and auxiliary cutting means disposed in said material receiving throat comprising a frame and a plurality of side by side endless cutter chains movable on said frame, said endless chain cutter elements moving in the same direction as said material moving conveyor, and being so related to said throat as to cut large fragments to proper size by holding said large fragments at said throat.

References Cited in the file of this patent

UNITED STATES PATENTS

| | | |
|---|---|---|
| 1,603,621 | McKinlay | Oct. 19, 1926 |
| 2,792,204 | Cartlidge | May 14, 1957 |
| 2,798,711 | Silver | July 9, 1957 |